Patented Oct. 13, 1953

2,655,549

UNITED STATES PATENT OFFICE 2,655,549

PROCESS FOR THE PREPARATION OF LUBRICATING OIL ADDITIVES

Lester Marshall Welch, Madison, and George E. Serniuk, Roselle, N. J., assignors to Standard Oil Development Company, a corporation of Delaware No Drawing. Application August 30, 1950,
Serial No. 182,417

3 Claims. (Cl. 260—671)

This invention relates to lubricating oil additives and to a process for their manufacture. Particularly the invention relates to a process for the preparation of lubricating oil additives having the desirable characteristic of lowering the pour point of lubricating oils with which they are blended. More particularly, the invention relates to a process for the preparation of lubricating oil additives having pour point depressing properties which involves the simultaneous polymerization and alkylation of vinyl aromatic compounds.

The art of the manufacture of lubricating oil additives has long been familiar with processes of modification of various aromatics and aromatic derivatives to produce compounds having the long side chains necessary to modify the low temperature crystalline structure of wax present in some lubricating oils. Such processes as alkylation and acylation of aromatic compounds such as benzene, naphthalene and their derivatives are well described in patent literature.

It is also known in the art that vinyl aromatics, such as vinyl benzene or styrene, can be polymerized either alone or with other olefinic hydrocarbons, to give linear molecules with recurring aromatic rings. The patent literature also describes processes for the modification of these polymers and copolymers by procedures of acylation, alkylation, and the like.

It is the object of this invention to furnish the art of lubricant additive manufacture with a new process for the preparation of these modified vinyl aromatic compounds which involves a simultaneous polymerization of the vinyl aromatics, to form an essentially linear type molecule with recurring aromatic groups, accompanied by alkylation of the aromatic portion of the molecule with compounds having the requisite number of carbon atoms in a predominantly straight chain to give the desired wax modification properties. So far as applicants are aware, this is the first teaching of such a simultaneous process.

Broadly speaking, this improved process involves admixing a xinyl aromatic with a halo-alkane and delivering to the mixture a complex of a Friedel-Crafts catalyst. The reaction may be effected in a diluent or a non-diluent system and at a wide range of temperatures. When high molecular weight products are desired the temperature should be low during the early part of the reaction when polymer formation is taking place and may be raised to complete the alkylation reaction. When the reaction is completed the catalyst is quenched with an alcohol, the product diluted with a hydrocarbon solvent and filtered to remove the catalyst-alcohol reaction product. The filtrate is then treated with a filter aid and again filtered. The final product is then recovered by stripping the solvent from the second filtrate by a distillation step.

In carrying out the improved process of this invention, any of the commonly known vinyl aromatics, either substituted or not, may be used. For example, styrene, alpha-methyl styrene, para-methyl styrene, alpha-methyl para-methyl styrene, vinyl naphthalene, vinyl anthracene, vinyl carbazole and the like are operable vinyl aromatics. Styrene is the preferred compound however, due to its economic advantage, and is utilized in the preferred embodiment.

A wide range of alkylating agents are operable in this improved process. In general, alkyl halides of varying molecular weight prepared by any of the following general reactions may be employed:

(a) By replacement of an "OH" group in alcohols by a halogen by means of hydrogen chloride, hydrogen bromide, etc., or by the reaction of the "OH" group with dry HCl over a catalytic surface or by the reaction of the "OH" group with $PCl_5$, $PCl_3$, or $SOCl_2$ and the like.

(b) By the addition of halogen acids to unsaturated hydrocarbons to yield primary, secondary, or tertiary halides or by the addition of HX to unsaturated esters.

(c) By the halogenation of saturated hydrocarbons, which process may be effected in the absence of a catalyst at moderately high temperatures or moderately low temperatures in the presence of Friedel-Crafts catalysts.

Exemplary of the low molecular weight haloalkanes which may be used are methyl chloride, methyl bromide, ethyl chloride, ethyl fluoride, isopropyl chloride, any of the several amyl or hexyl chlorides, normal or iso-octyl chloride, or 1-fluoro, 2-methyl propane. Higher molecular weight members of the halo-alkane series such as the lauryl chlorides, the lauryl fluorides, the octadecyl chlorides, the octadecyl fluorides or mixtures of the above may be used. Halogen derivatives of substances which consist of a mixture of hydrocarbons such as paraffin wax, petroleum and the like, or halogen derivatives of hydrocarbon oils such as naphtha, kerosene, gas oil, or lube oil fractions are operable. If a single halo-alkane is used it is preferred that the secondary halo-alkanes be utilized, that is, those halo-alkanes in which the halogen atom is not on the terminal carbon atom. Especially preferred and contemplated in the preferred embodiment are the chlorinated paraffin waxes containing from about 8 to 32 carbon atoms chlorinated to a chlorine content of from about 8% to 14.5%.

The catalyst used is normally added to the mixture of vinyl compound and the halo-alkane in the form of a complex. To form the complex any of the aliphatic or aromatic nitro compounds, exemplified by nitromethane or nitrobenzene, is admixed with the desired Friedel-Crafts catalyst outside the reaction zone and added in the form of a solution. In this manner better control of the reaction is obtained.

The catalyst used may be any of the well known Friedel-Crafts catalysts such as $AlCl_3$, $AlBr_3$, $AlBr_2Cl$, $AlBr_2OH \cdot AlBr_3$, $AlIBr_2$, $BF_3$, and the like. $AlCl_3$ is the preferred catalyst.

The temperature limitations upon the process of this invention are varied. Although the polymerization and alkylation processes are going on concurrently during the initial stages of the reaction, polymerization of the vinyl aromatic is principal. During the initial stages, then, the temperature of the reaction mixture is adjusted to one most favorable to obtain the desired degree of polymerization. If a high molecular weight product is desired, the reaction temperature should be held in the initial stages of the reaction to one within a range of from −20° C. to room temperature, lower temperatures allowing a greater degree of polymerization and a consequent higher molecular weight. In the second stage of the reaction, of principal occurrence is the completion of the alkylation reaction, and during this stage the temperature should be allowed to rise from the temperature of the initial stage. Temperatures of from 50° C. to 100° C. are satisfactory for this second stage, and one within a range of from 75° C. to 80° C. is preferred.

The proportions of the constituents of the reaction mixture may be varied widely, depending upon the final product desired. At the outset it may be stated that the preferred embodiment of the invention contemplates the use of equimolar or higher proportions of alkylating agent to the vinyl aromatic. The one absolute limitation on the process is that the proportions be so adjusted that there results an oil soluble product having a sufficient number of long chains to confer upon it the desired wax-modifying characteristics.

As stated above, the reaction may be carried out in the presence of or absence of a diluent. It is generally preferred to utilize the ease of control of product quality inherent in the diluent technique, and among operable diluents may be mentioned carbon disulfide, nitrobenzene, nitromethane, orthodichlorobenzene, in brief, any of the inert polar diluents with which the art is familiar.

The final product of this invention may be blended directly with the lubricating oil base. Concentrations within a range of from 0.03% to 10% by weight of the additive material in the lubricant will be operable and will give the desirable wax modifying characteristics. Oil compositions containing from 0.5% to 5.0% by weight of the additive material are preferred. However, oil concentrates of the additive material, containing from 10% to 80% by weight, may also be prepared and the final lubricating composition prepared using this concentrate.

The concept of this invention may be more clearly explained by reference to the following examples:

EXAMPLE I 2-liter, 3-way flask fitted with a mechanical stirrer, condenser, gas outlet tube, delivery funnel and thermometer, was charged with 52 g. of monomeric styrene (0.5 mol) and 372.5 g. of chlorinated wax containing 10% chlorine (1.0 mol) and a complex formed by combining 50 cc. of nitrobenzene with 8.9 g. of anhydrous aluminum chloride ($AlCl_3$) (2.4% $AlCl_3$ based on the chlorinated wax) was added dropwise to the charge at a temperature within a range of from 40° C. to 50° C. The temperature was held at this initial temperature stage for about 0.5 hour. After this time the temperature was raised to about 80° C. and maintained at this final temperature for about 4 hours. The catalyst was then quenched by a slow delivery of methanol. The reaction mixture was then filtered, and the filtrate treated with an Attapulgus clay. The solvent was stripped from the second filtrate by distillation. There was recovered 310 g. of a highly viscous product representing 80% yield.

EXAMPLE II

In this example 52 g. (0.5 mol) of styrene and 230 g. (0.62 mol) of chlorinated wax containing 10% chlorine were charged to the reactor. A solution of 9.3 g. of $AlCl_3$ in 50 cc. of nitromethane (4% aluminum chloride based on the chlorinated wax) was added slowly. The initial reaction temperature was maintained at 35° C. to 45° C. for about 0.5 hour. At the end of this time the temperature was raised to 60° C. to 70° C. and maintained at this level for about 4 hours. There were recovered, using the procedure of Example I, 163 g. of a product representing 63% yield.

EXAMPLE III

Example II was repeated using 460 g. (1.24 mols) of chlorinated wax containing 10% chlorine instead of the amount used in Example II above. 165 g. of a product was obtained representing 63% yield.

The products prepared in accordance with Examples I to III above were blended with Mid-Continent distillates of SAE 10, 20 and 30 grades, respectively. These various oil blends were submitted to the ASTM pour point test and the results are set out in Table I below:

POLYMERIZATION AND ALKYLATION OF STYRENE

| Example | Styrene mols | Mols Cl-wax (10% Cl) | Cat. | Percent cat. on Cl-wax | Cat. solv. | Temp. (° C.) | | Yield, percent | Add. conc. percent | ASTM pour, ° F. Mid-Continent oils, SAE | | |
|---|---|---|---|---|---|---|---|---|---|---|---|---|
| | | | | | | Initial | Final | | | 10 | 20 | 30 |
| I | 0.5 | 1.0 | $AlCl_3$ | 2.4 | $C_6H_5NO_2$ | 40–50 | 80 | 80 | 0 | +5 | +10 | +15 |
| | | | | | | | | | .01 | 0 | +10 | +10 |
| | | | | | | | | | .03 | −5 | 0 | +5 |
| | | | | | | | | | .05 | −5 | −5 | 0 |
| | | | | | | | | | .10 | −25 | −20 | −15 |
| | | | | | | | | | .20 | −30 | −30 | −25 |
| II | .5 | .62 | $AlCl_3$ | 4.0 | $CH_3NO_2$ | 35–40 | 60–70 | 63 | .10 | −15 | −15 | +5 |
| | | | | | | | | | .20 | −30 | −25 | −15 |
| III | .5 | 1.24 | $AlCl_3$ | 4.0 | $CH_3NO_2$ | 35–40 | 60–70 | 63 | .10 | −15 | −15 | −10 |
| | | | | | | | | | .20 | −30 | −25 | −25 |

It will be noted upon examination of the data in Table I above that the products of this invention have outstanding utility as pour point depressants.

As has been set out above, the preferred alkylating agent for the materials of this invention are the halo-alkanes, particularly the halogenated paraffin waxes. However, as a second concept of this invention it is also contemplated that the alkylating agent may consist of olefins and mixtures of olefins. These olefins and mixtures of olefins used in the reaction must be linear and $C_{12}$ to $C_{22}$ in chain length in order to obtain pour depressant activity. For preparation of viscosity index improvers alone any olefin other than ethylene and isobutylene is suitable although propylene, n-butylene, amylene, polypropylenes, diisobutylene, or cracked wax olefins are more generally available. In general, the olefin must be relatively difficult to polymerize or copolymerize under the conditions under which the vinyl aromatic is polymerized and alkylated.

When using olefinic alkylating agents, suitable catalysts are any of the Friedel-Crafts catalysts mentioned above or acidic type alkylating catalysts or complexes thereof. Suitable solvents include carbon disulfide, chloro-aromatics, ethylene dichloride, tetrachloroethylene and the like. For optimum results, it is desirable to hold reaction temperatures in the neighborhood of 35° F. or lower.

The preparation of reactants is the same as in the principal embodiment outlined above.

The pour depressing additives of this invention are perfectly compatible with other additive materials and may be blended successfully with lubricating oil compositions containing minor amounts of other pour depressors, viscosity index improvers, rust inhibitors, oiliness agents, oxidation inhibitors, and the like.

To summarize briefly, this invention relates to lubricating oil additives having pour depressing properties, and the process of their preparation. The additive materials of this invention are prepared by the simultaneous polymerization, and alkylation of vinyl aromatic compounds or derivatives of vinyl aromatic compounds in the presence of a complex of a Friedel-Crafts catalyst. In the preferred embodiment of the invention styrene is admixed in a suitable diluent with a chlorinated paraffin wax containing from 8 to 14.5% chlorine and to the mixture is added an aluminum chloride catalyst-complex.

What is claimed is:

1. An improved process for the manufacture of a lubricating oil additive material having the desirable characteristic of depressing the pour point of lubricating oils into which it is incorporated which comprises admixing substantially equimolar proportions of a vinyl aromatic and a halo-alkane alkylating agent in a polar solvent, adding thereto a complex obtained by admixing a Friedel-Crafts catalyst with a material selected from the class consisting of nitromethane and nitrobenzene, maintaining the temperature of the mixture at one within the range of from −20° C. to 50° C. for a period of time sufficient to polymerize substantially all of the vinyl aromatic, and thereafter raising the reaction temperature to one within a range of from 60° C. to 100° C. to obtain the desired final product.

2. A process according to claim 1 wherein the vinyl aromatic is styrene, the alkylating agent is a chlorinated paraffin wax containing from 8 to 14.5% chlorine, and the Friedel-Crafts catalyst is aluminum chloride.

3. An improved process for the manufacture of a lubricating oil additive material having the desirable characteristic of depressing the pour point of lubricating oils into which it is incorporated which comprises admixing substantially equimolar proportions of a vinyl aromatic and a haloalkane containing from 8 to 14.5% halogen in an inert, polar diluent, adding to said mixture a complex formed by admixing substantially equimolar proportions of a Friedel-Crafts catalyst and nitromethane, maintaining the temperature of the reaction mixture at one within the range of from −20° C. to 50° C. for about one hour, and thereafter raising the temperature of the reaction to one within the range of from 75° to 80° C. and maintaining that temperature for about 4 hours.

LESTER MARSHALL WELCH.
GEORGE E. SERNIUK.

References Cited in the file of this patent

UNITED STATES PATENTS

| Number | Name | Date |
|---|---|---|
| 2,072,120 | Mikeska et al. | Mar. 2, 1937 |
| 2,076,201 | Langedijk et al. | Apr. 6, 1937 |
| 2,209,462 | Lieber et al. | July 30, 1940 |
| 2,282,456 | Christmann et al. | May 12, 1942 |
| 2,485,454 | Nelson et al. | Oct. 18, 1949 |
| 2,569,400 | Butler | Sept. 25, 1951 |

FOREIGN PATENTS

| Number | Country | Date |
|---|---|---|
| 640,567 | Great Britain | July 26, 1950 |